(12) United States Patent
Merkes (10) Patent No.: US 12,274,386 B2
(45) Date of Patent: Apr. 15, 2025

(54) FOLDABLE TRAY ASSEMBLY

(71) Applicant: Morgan Merkes, Bonney Lake, WA (US)

(72) Inventor: Morgan Merkes, Bonney Lake, WA (US)

( * ) Notice: Subject to any disclaimer, the term of this patent is extended or adjusted under 35 U.S.C. 154(b) by 39 days.

(21) Appl. No.: 18/238,233

(22) Filed: Aug. 25, 2023

(65) Prior Publication Data

US 2025/0064239 A1 Feb. 27, 2025

(51) Int. Cl.
*A47C 7/62* (2006.01)
*A47G 23/06* (2006.01)
*B64D 11/06* (2006.01)

(52) U.S. Cl.
CPC ..... *A47G 23/0633* (2013.01); *A47G 23/0641* (2013.01); *B64D 11/0638* (2014.12)

(58) Field of Classification Search
CPC .............. A47G 23/0633; A47G 23/064; B64D 11/0638; A47D 1/103; A47D 1/0085; A47D 5/006; A47C 1/16; A47C 7/021; A47C 7/62; B60R 7/043; B60R 11/0252; B60N 3/004; B60N 3/102; B60N 3/103; B60N 3/002; B60N 3/005
USPC .............. 108/44, 25; 224/275, 926, 153; 297/188.06; 248/311.2; 206/549, 557
See application file for complete search history.

(56) References Cited

U.S. PATENT DOCUMENTS

| | | | |
|---|---|---|---|
| 1,653,246 A * | 12/1927 | Zichy ..................... | A47D 5/006 206/223 |
| 3,817,190 A * | 6/1974 | Evangelista ........... | B60N 3/002 108/44 |
| 4,466,659 A * | 8/1984 | Carpentier .............. | A47C 7/70 224/318 |
| D311,301 S | 10/1990 | Starnes | |
| 5,148,755 A * | 9/1992 | Morales ................. | A47B 97/00 248/909 |
| 5,690,036 A | 11/1997 | Hasegawa | |
| 5,878,672 A * | 3/1999 | Ostermann ........... | B60N 3/004 297/188.06 |
| D415,995 S | 11/1999 | Kanehl, Jr. | |
| 6,409,137 B1 | 6/2002 | Tran | |
| 7,533,860 B2 | 5/2009 | Somuah | |
| 9,615,540 B1 | 4/2017 | Mansour | |
| 2001/0039903 A1 | 11/2001 | Patterson | |
| 2007/0205640 A1 | 9/2007 | Pecorino | |
| 2011/0155024 A1* | 6/2011 | McCaffrey ............. | B60N 3/004 108/26 |
| 2014/0360410 A1 | 12/2014 | Robinson | |

FOREIGN PATENT DOCUMENTS

GB 2498362 7/2013

\* cited by examiner

Primary Examiner — King M Chu (57) ABSTRACT

A foldable tray assembly for securely storing food and beverages in a vehicle or an article of luggage includes a tray which includes a first panel hingedly coupled to a second panel such that the tray is positionable between a flattened position and a folded position. A net is attached to the tray and the net surrounds the tray to inhibit the objects from sliding off of the tray. A cup holder unit is hingedly attached to the tray and the cup holder unit is positionable in a deployed position when the tray is in the flattened position to support a pair of beverage containers. A pair of grapples is each pivotally attached to the tray to engage a support object thereby mounting the tray to the support object.

11 Claims, 9 Drawing Sheets

FOLDABLE TRAY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

The Names of the Parties to a Joint Research Agreement

Not Applicable

Incorporation-by-Reference of Material Submitted on A Compact Disc or as a Text File Via the Office Electronic Filing System Not Applicable

Statement Regarding Prior Disclosures by the Inventor or Joint Inventor

Not Applicable

BACKGROUND OF THE INVENTION (1) Field of the Invention

The disclosure relates to tray devices and more particularly pertains to a new tray device for securely supporting food and beverages for consumption while traveling. The device includes a tray that is foldable into a folded position or a flattened position and a net extending around the tray for restraining objects placed on the tray. The device includes a cup holder unit that is integrated into the tray for holding drinks. The device includes a pair of grapples each attached to the tray for engaging a support object and a plurality of straps that are matable to each other for further securing the tray to the support object.

(2) Description of Related Art Including Information Disclosed Under 37 CFR 1.97 and 1.98.

The prior art relates to tray devices including a variety of cup holder devices that each has a hook shaped hanger for suspending a cup holder on a back of a seat in a vehicle and a variety of tray devices that is each foldable for storage and which each includes hook shaped hangers and straps for securing to a seat in a vehicle. Furthermore, In each instance of tray devices the trays are defined by a planar panel. In no instance does the prior art discloses a portable tray device that includes a tray comprised of a pair of foldable panels, a net surround the tray and a cup holder unit that is pivotally attached to the tray.

BRIEF SUMMARY OF THE INVENTION

An embodiment of the disclosure meets the needs presented above by generally comprising a tray which includes a first panel hingedly coupled to a second panel such that the tray is positionable between a flattened position and a folded position.

A net is attached to the tray and the net surrounds the tray to inhibit the objects from sliding off of the tray. A cup holder unit is hingedly attached to the tray and the cup holder unit is positionable in a deployed position when the tray is in the flattened position to support a pair of beverage containers. A pair of grapples is each pivotally attached to the tray to engage a support object thereby mounting the tray to the support object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 10 thereof, a new tray device embodying the principles and concepts of an embodiment of the disclosure and generally designated by the reference numeral 10 will be described.

As best illustrated in FIGS. 1 through 10, the foldable tray assembly 10 generally comprises a tray 12 which comprises a first panel 14 that is hingedly coupled to a second panel 16 such that the tray 12 is positionable between a flattened position and a folded position. The first panel 14 has a first edge 18 which is hingedly coupled to a primary edge 20 of the second panel 16. A top surface 22 of the first panel 14 lies on a plane that is coplanar with an upper surface 24 of the second panel 16 when the tray 12 is in the flattened position to support items. The top surface 22 of the first panel 14 is oriented to face the upper surface 24 of the second panel 16 when the tray 12 is in the folded position thereby facilitating the tray 12 to be placed in storage.

A net 26 is attached to the tray 12 and the net 26 surrounds the tray 12 to inhibit the objects from sliding off of the tray 12. The net 26 has a bottom edge 28 which is attached to the top surface 22 of the first panel 14 and the upper surface 24 of the second panel 16. The bottom edge 28 extends substantially around a perimeter edge 30 of each of the first panel 14 and the second panel 16 when the tray 12 is in the flattened position. Additionally, the net 26 is folded between the first panel 14 and the second panel 16 when the tray 12 is in the folded position. The net 26 has a tube 32 that is positioned to extend around a top edge 33 of the net 26 and an elastomeric drawstring 34 is positioned within the tube 32 for retaining the net 26 in a preferred shape when the tray 12 is in the flattened position.

A cup holder unit 36 is hingedly attached to the tray 12 and the cup holder unit 36 is positionable in a deployed position when the tray 12 is in the flattened position to support a pair of beverage containers 38. The cup holder unit 36 is positionable in a stored position having the cup holder unit 36 resting against the net 26. The cup holder unit 36 comprises an upright panel 40 that has a back side 42 which is attached to the net 26 such that an upper edge 44 of the upright panel 40 is aligned with the tube 32 on the top edge 33 of the net 26 and a lower edge 46 of the upright panel 40 is positioned adjacent to the tray 12.

A pair of bumpers 48 is provided and each of the bumpers 48 has a first surface 50 that is bonded to a front side 52 of the upright panel 40. Each of the bumpers 48 is elongated to extend along an axis that is oriented parallel with the upper edge 44 of the upright panel 40. Each of the bumpers 48 has a second surface 54 which curves toward the first surface 50 between each of a first end 56 and a second end 58 of the bumpers 48. In this way the second surface 54 of each of the bumpers 48 can conform to curvature of the beverage container 38. Additionally, the bumpers 48 are spaced apart from each other on the front side 52 of the upright panel 40.

A pair of elastomeric bands 60 each has a first end 62 that is coupled to the first end 56 of a respective one of the bumpers 48 and a second end 64 that is coupled to the second end 58 of a respective one of the bumpers 48. In this way each of the elastomeric bands 60 extends across the second surface 54 of the respective bumper 48. Each of the elastomeric bands 60 has a grip 66 that is centrally located on the elastomeric bands 60 and the grip 66 on a respective one of the elastomeric bands 60 can be gripped to stretch the respective elastomeric band 60 around the beverage container 38. In this way the beverage container 38 can be secured against the respective bumper 48.

A support panel 68 is provided which has a rear edge 70 that is hingedly coupled to the lower edge 46 of the upright panel 40. The support panel 68 has a top surface 72 which lies on a plane that is perpendicularly oriented with the front side 52 of the upright panel 40 when the cup holder unit 36 is positioned in the deployed position. In this way a bottom end 74 of the beverage containers 38 can be placed on the top surface 72 of the support panel 68. The top surface 72 of the support panel 68 is directed toward the front side 52 of the upright panel 40 when the cup holder unit 36 is positioned in the stored position.

The support panel 68 has a lip 76 extending upwardly from the top surface 72 of the support panel 68 and the lip 76 extends along a first lateral edge 78 and a second lateral edge 80 of the support panel 68. Additionally, the lip 76 has a pair of curved sections 82 each extending from a front edge 84 of the support panel 68 toward the rear edge 70 of the support panel 68. Each of the curved sections 82 has an apex 86 that is spaced from the rear edge 70 and each of the curved sections 82 is aligned with a respective one of the bumpers 48. In this way each of the curved sections 82 of the lip 76 can restrain the bottom end 74 of a respective one of the beverage containers 38 thereby inhibiting the bottom end 74 from sliding along the top surface 22 of the support panel 68.

A pair of grapples 88 is provided and each of the grapples 88 is pivotally attached to the tray 12. Each of the grapples 88 is positionable in a deployed position when the tray 12 is in the flattened position to engage a support object 90 thereby mounting the tray 12 to the support object 90. Each of the grapples 88 is positionable in a stored position when the tray 12 is in the folded position having the pair of grapples 88 resting against the tray 12. Each of the grapples 88 comprises a sleeve 92 that has a lower end 94 and an upper end 96 and the sleeve 92 has a pivot point 98 located adjacent to the lower end 94. The pivot point 98 pivotally engages the perimeter edge 30 of the first panel 14 of the tray 12. The upper end 96 is open, the lower end 94 is closed and the sleeve 92 extends upwardly along the net 26 having the upper end 96 being aligned with the tube 32 on the top edge 33 of the net 26 when the sleeve 92 is a deployed position. The sleeve 92 rests against a bottom surface 100 of the first panel 14 when the sleeve 92 is in a stored position.

Each of the grapples 88 includes a hook 102 which has a primary end 104 that is inserted into the upper end 96 of the sleeve 92. The hook 102 has a series of bends 106 that are spaced apart from each other and are distributed from a secondary end 107 of the hook 102 toward the primary end 104 of the hook 102. The series of bends 106 define a top portion 108 of the hook 102 that is perpendicularly oriented between a leg portion 110 of the hook 102 and a finger portion 112 of the hook 102. The primary end 104 is associated with the leg portion 110 and the secondary end 107 is associated with the finger portion 112. The top portion 108 of the hook 102 rests on top of the support object 90 having the finger portion 112 extending downwardly behind the support object 90.

Figure 1:
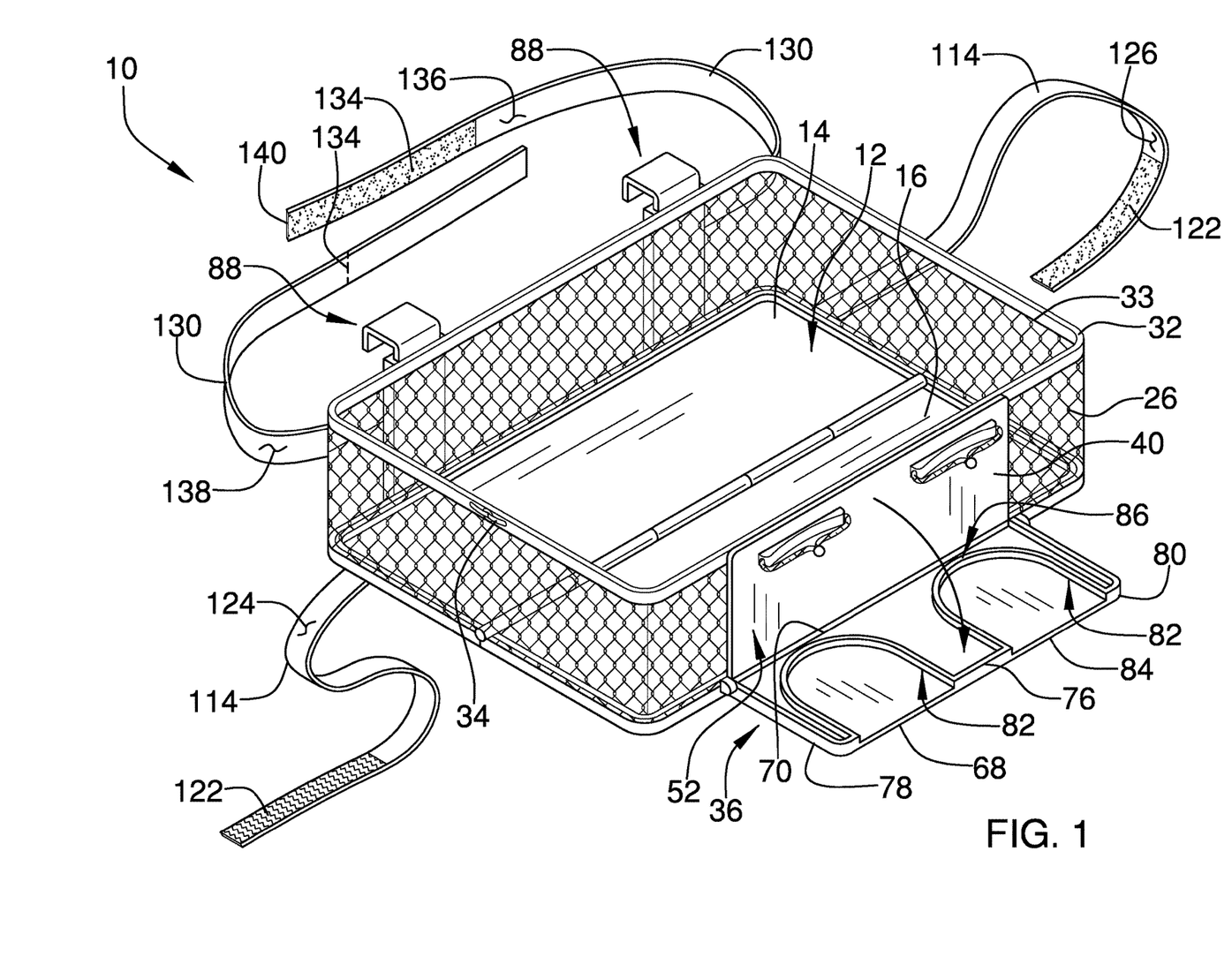
FIG. 1 is a front perspective view of a foldable tray assembly according to an embodiment of the disclosure.
Figure 2:
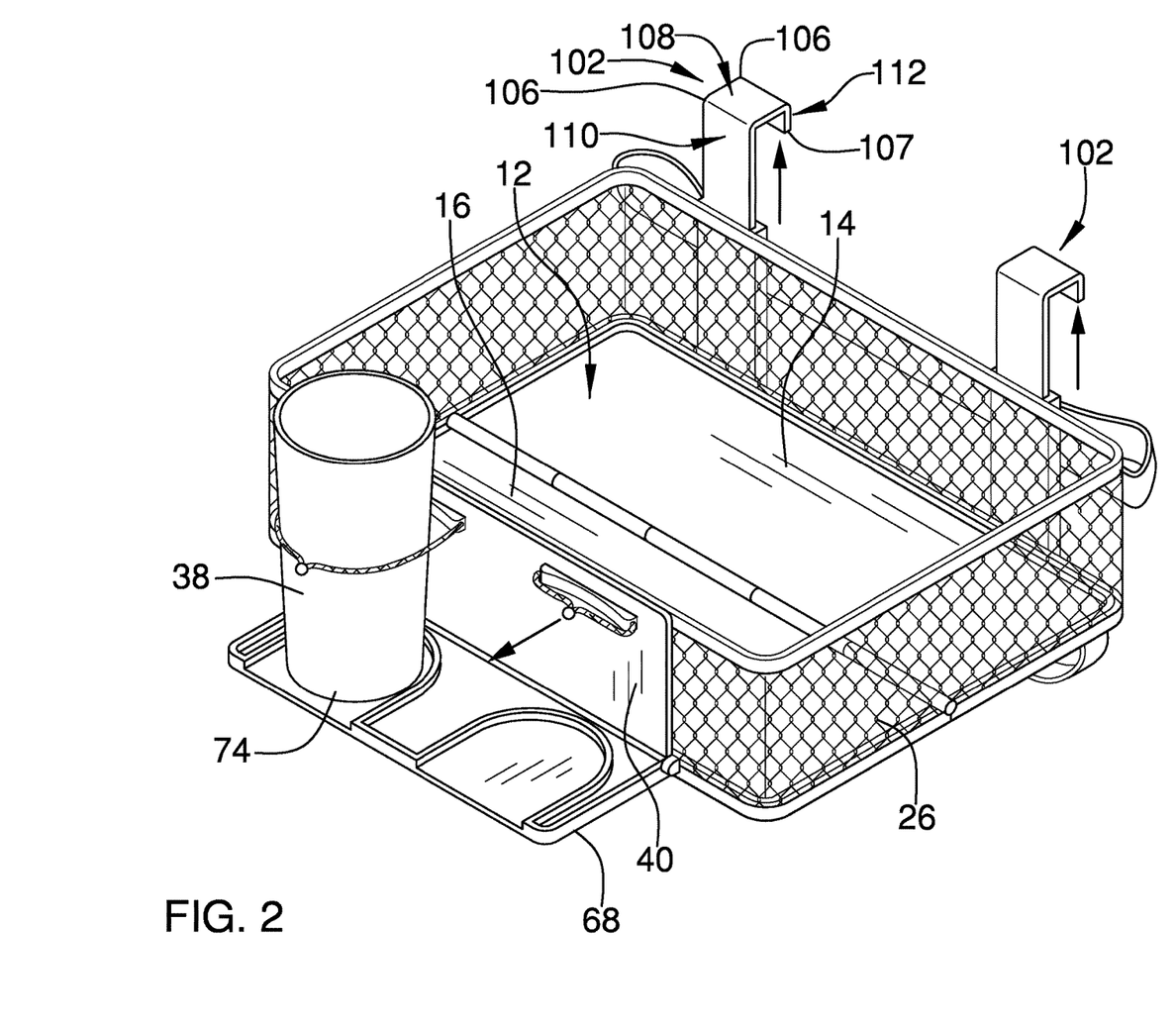
FIG. 2 is a top perspective view of an embodiment of the disclosure.
Figure 3:
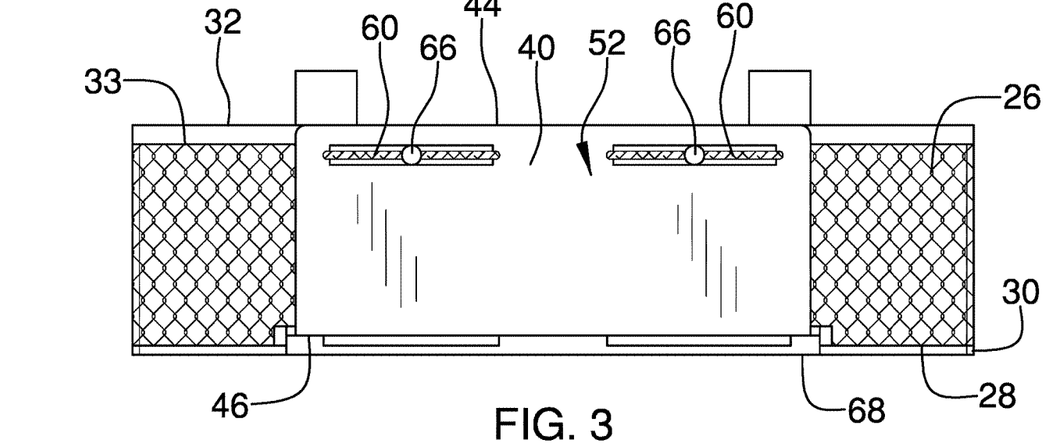
FIG. 3 is a front view of an embodiment of the disclosure.
Figure 4:
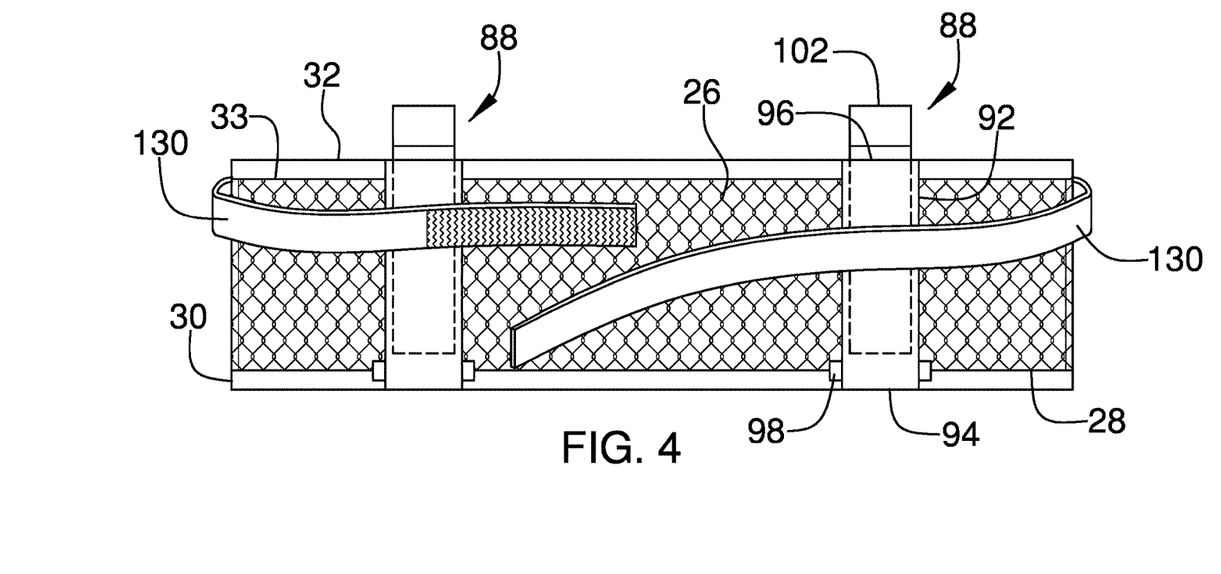
FIG. 4 is a back view of an embodiment of the disclosure.
Figure 5:
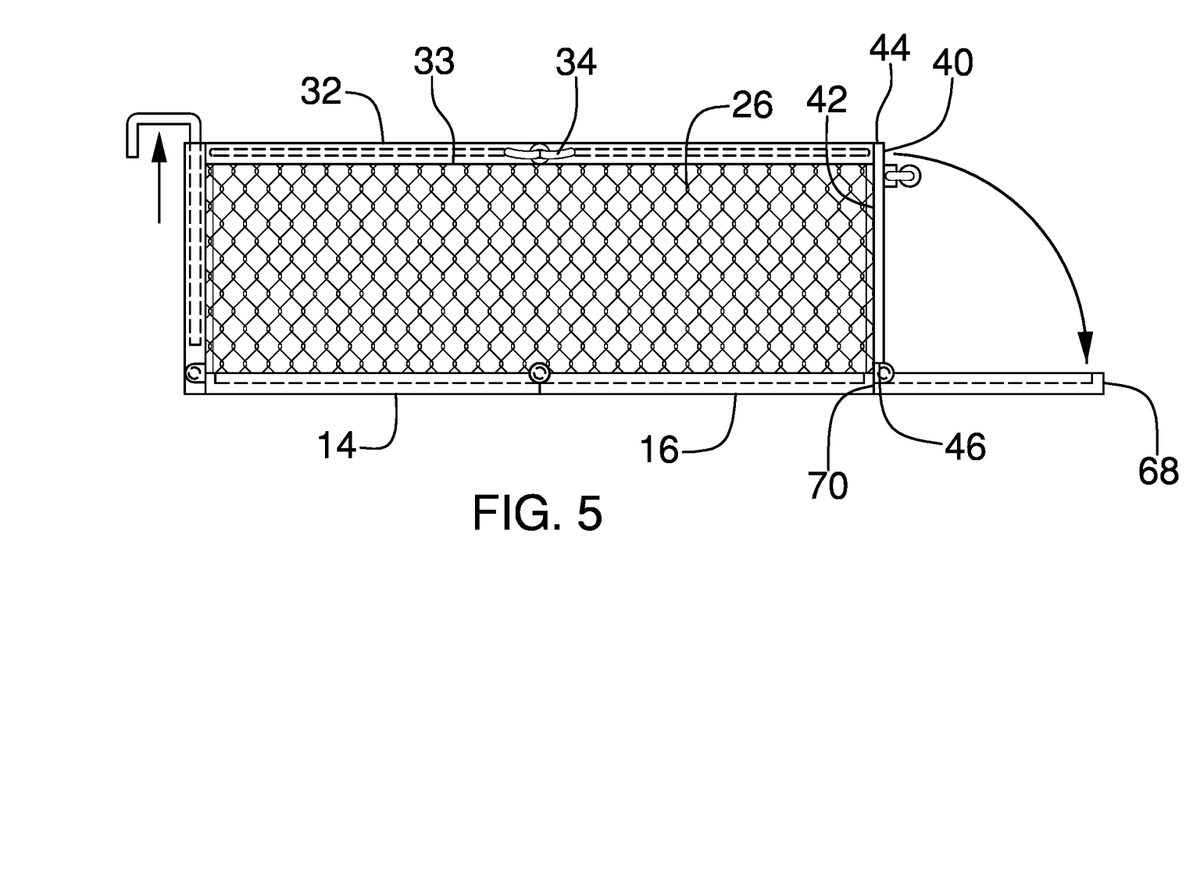
FIG. 5 is a right side view of an embodiment of the disclosure.
Figure 6:
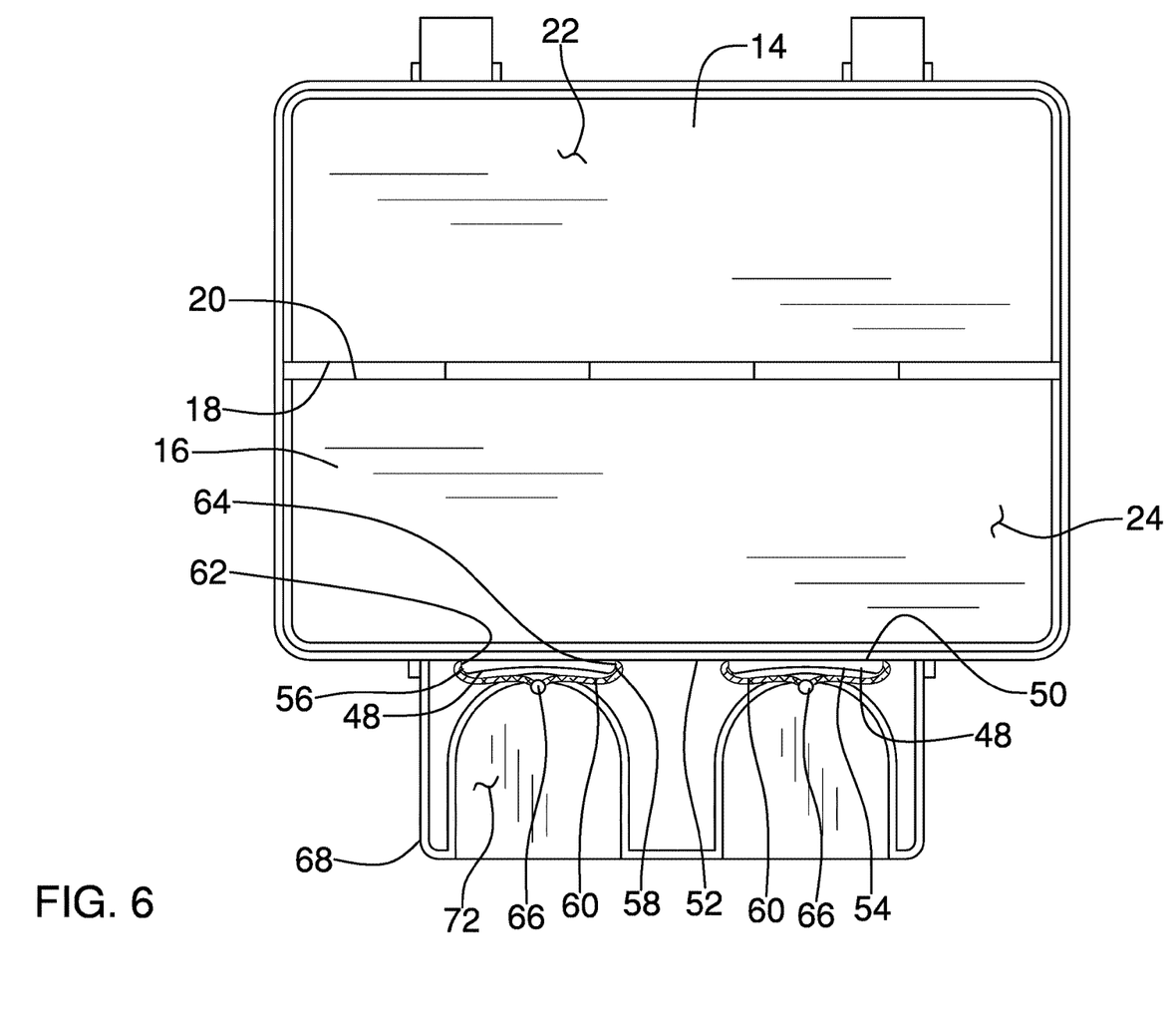
FIG. 6 is a top view of an embodiment of the disclosure.
Figure 7:
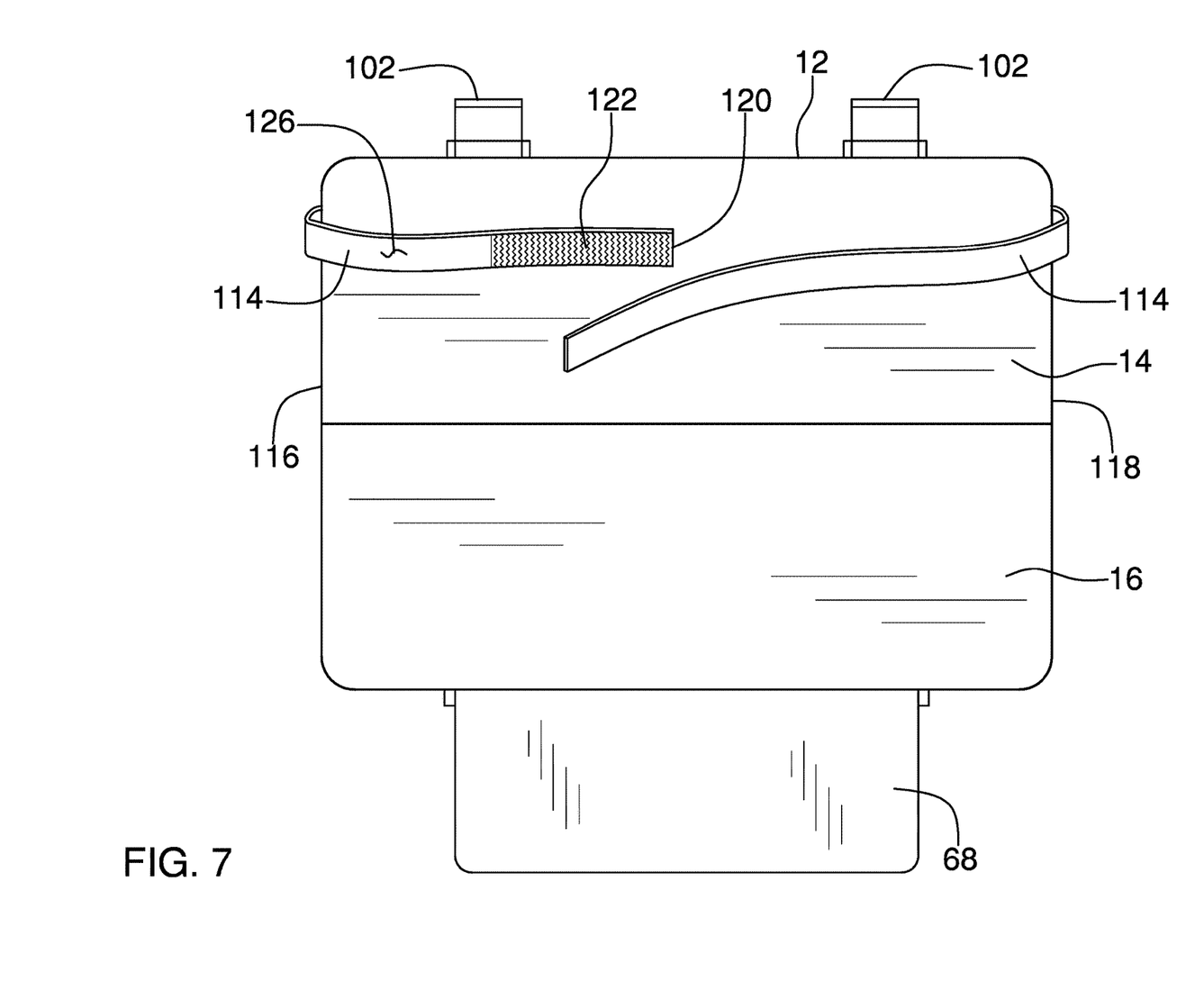
FIG. 7 is a bottom view of an embodiment of the disclosure.
Figure 8:
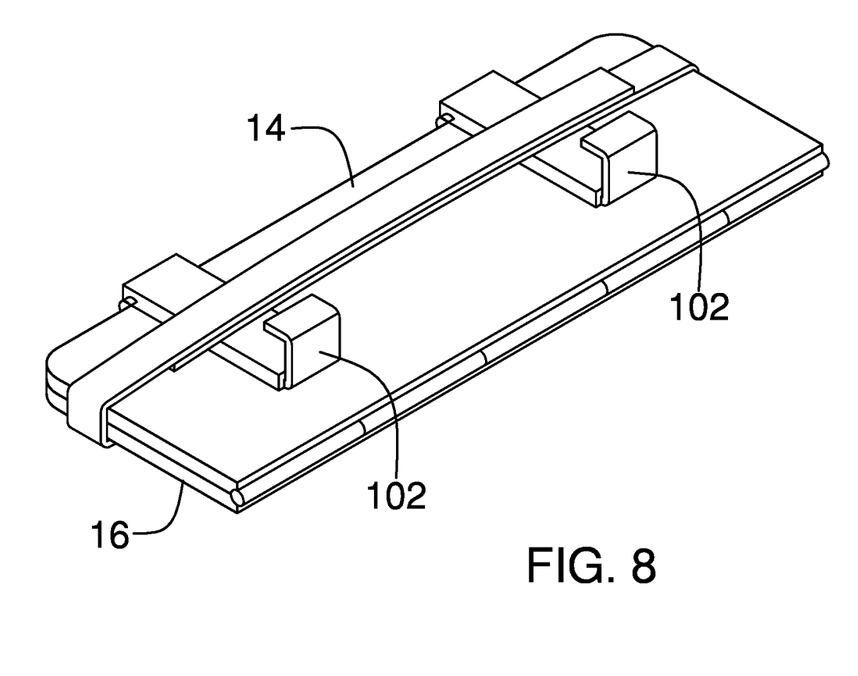
FIG. 8 is a perspective view of an embodiment of the disclosure showing a tray in a folded position.
Figure 9:
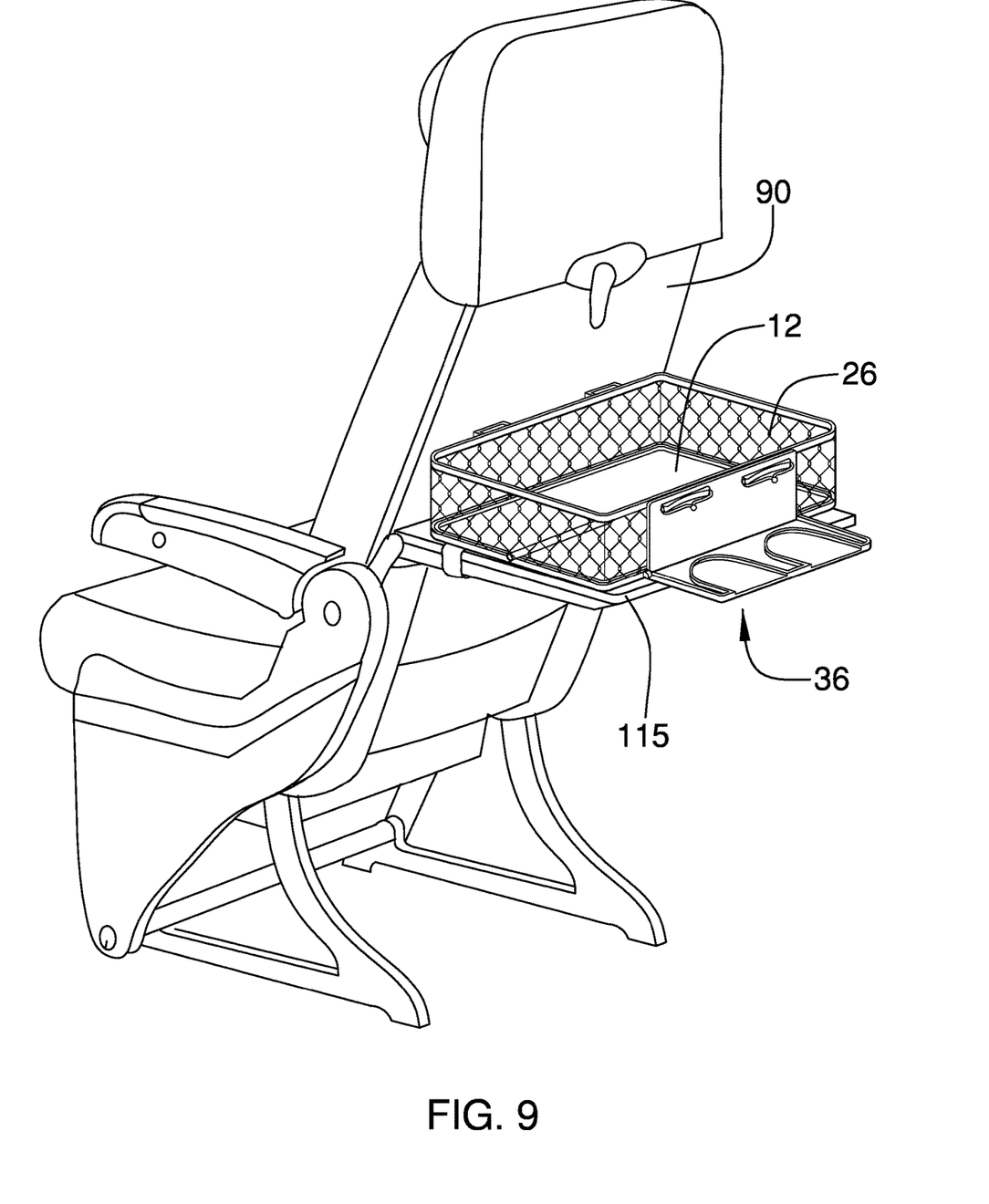
FIG. 9 is a perspective in-use view of an embodiment of the disclosure.
Figure 10:
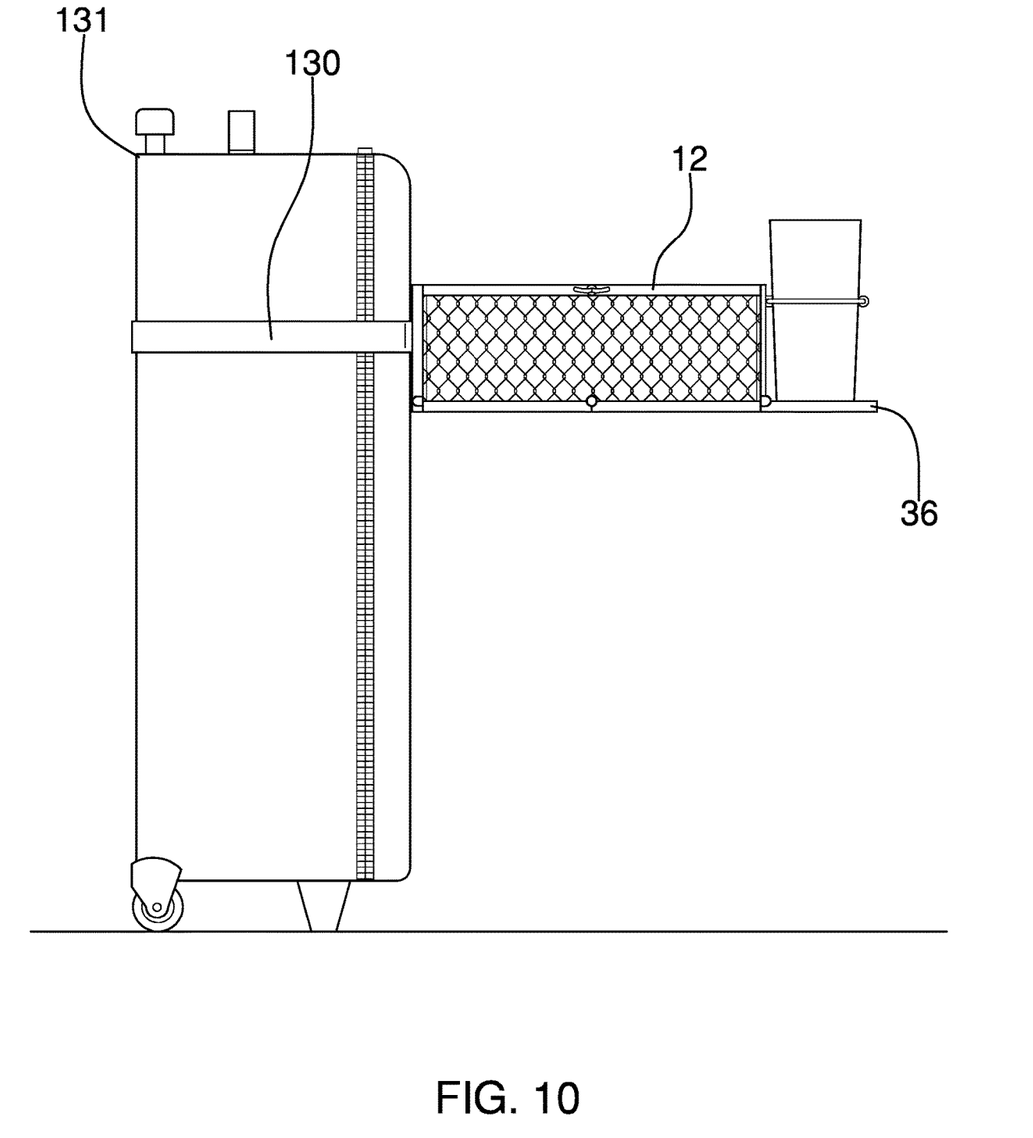
FIG. 10 is a perspective in-use view of an embodiment of the disclosure showing a tray being secured to an article of luggage.

A pair of first straps 114 is each coupled to the tray 12 and each of the first straps 114 is matable to each other. In this way the pair of first straps 114 can be wrapped around a support 115 upon which the tray 12 is positioned, such as a fold down tray on an aircraft seat as is shown in FIG. 9. Each of the first straps 114 extends away from a respective one of a first lateral side 116 and a second lateral side 118 of the perimeter edge 30 of the first panel 14 of the tray 12. Additionally, each of the first straps 114 has a distal end 120 with respect to the respective first lateral side 116 or second lateral side 118. A pair of first mating members 122 is each attached to a respective one of a top surface 124 or a bottom surface 126 of a respective one of the pair of first straps 114 and each of the first mating members 122 is positioned adjacent to the distal end 120 of the respective first strap 114. Furthermore, each of the first mating members 122 is releasably matable to each other to secure the first straps 114 around the support 115 upon which the tray 12 is positioned. Each of the pair of first mating members 122 may comprise respective parts of a hook and loop fastener or other type of releasable fastener.

A pair of second straps 130 is provided and each of the second straps 130 is coupled to a respective one of the grapples 88. Each of the second straps 130 is matable to each other thereby facilitating each of the second straps 130 to be wrapped around an article of luggage 131. Each of the second straps 130 has a distal end 132 with respect to the sleeve 92 associated with the respective grapple 88. A pair of second mating members 134 is each attached to a respective one of a first surface 136 or a second surface 138 of a respective one of the second straps 130. Each of the second mating members 134 is positioned adjacent to the distal end 140 of a respective one of the second straps 130. Additionally, each of the second mating members 134 is releasably matable to each other to secure the second straps 130 around the article of luggage 131. Each of the pair of second mating members 134 may comprise respective portions of a hook 102 and loop fastener or other type of releasable fastener.

In use, the tray 12 positioned in the flattened position and each of the grapples 88 is attached to the support object 90, such as a storage sleeve on the back of a seat of a passenger aircraft, for example, or other type of multi passenger vehicle. In this way the tray 12 is horizontally oriented to support a meal, for example, or any other objects. The cup holder unit 36 can be positioned in the deployed position for supporting beverage containers 38 and the elastomeric bands 60 can be stretched around the beverage containers 38 for holding the beverage containers 38 in place. In this way the beverage containers 38 will not tip over due to the passenger aircraft experiencing turbulence, for example, or other occasions that would likely tip over the beverage containers 38. The tray 12 can additionally be laid on a horizontal support and the first straps 114 can be wrapped around the horizontal support. Each of the first straps 114 and can be positioned on the tray 12 and the tray 12 can be positioned in the folded position to facilitate the tray 12 to be transported. As is most clearly shown in FIG. 10, the pair of second straps 130 can be wrapped around an article of luggage for securing the tray 12 to the article of luggage 131.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A foldable tray assembly being attachable to a passenger seat or an article of luggage for supporting various items including food and drinks, said assembly comprising:

a tray comprising a first panel being hingedly coupled to a second panel such that said tray is positionable between a flattened position and a folded position;

a net being attached to said tray, said net surrounding said tray wherein said net is configured to inhibit the objects from sliding off of said tray;

a cup holder unit being hingedly attached to said tray, said cup holder unit being positionable in a deployed position when said tray is in said flattened position wherein said cup holder unit is configured to support a pair of beverage containers, said cup holder unit being positionable in a stored position having said cup holder unit resting against said net;

a pair of grapples, each of said grapples being pivotally attached to said tray, each of said grapples being positionable in a deployed position when said tray is in said flattened position wherein each of said grapples is configured to engage a support object thereby mounting said tray to the support object, each of said grapples being positionable in a stored position when said tray is in said folded position having said pair of grapples resting against said tray;

wherein said net has a tube attached to a top edge of said net; and wherein said cup holder unit comprises an upright panel having a back side being attached to said net such that an upper edge of said upright panel is aligned with said tube on said top edge of said net and having a lower edge of said upright panel being positioned adjacent to said tray.

2. The assembly according to claim 1, wherein said cup holder unit includes a pair of bumpers, each of said bumpers having a first surface being bonded to a front side of said upright panel, each of said bumpers being elongated to extend along an axis being oriented parallel with said upper edge of said upright panel, each of said bumpers having a second surface which curves toward said first surface between each of a first end and a second end of said bumpers wherein said second surface of each of said bumpers is configured to conform to curvature of a beverage cup, said bumpers being spaced apart from each other on said front side of said upright panel.

3. The assembly according to claim 2, wherein said cup holder unit includes a pair of elastomeric bands, each of said elastomeric bands having a first end being coupled to said first end of a respective one of said bumpers, each of said elastomeric bands having a second end being coupled to said second end of a respective one of said bumpers such that each of said elastomeric bands extends across said second surface of said respective bumper, each of said elastomeric bands having a grip being centrally located on said elastomeric bands wherein said grip on a respective one of said elastomeric bands is configured to be gripped to stretch said respective elastomeric band around the beverage cup for securing the beverage cup against said respective bumper.

4. The assembly according to claim 1, wherein said cup holder unit includes a support panel having a rear edge being hingedly coupled to said lower edge of said upright panel, said support panel having a top surface lying on a plane being perpendicularly oriented with said front side of said upright panel when said cup holder unit is positioned in said deployed position wherein said top surface of said support panel is configured to having a bottom end of the beverage containers placed on said top surface of said support panel, said top surface of said support panel being directed toward said front side of said upright panel when said cup holder unit is positioned in said stored position.

5. The assembly according to claim 4, wherein said support panel has a lip extending upwardly from said top surface of said support panel, said lip extending along a first lateral edge and a second lateral edge of said support panel, said lip having a pair of curved sections each extending from a front edge of said support panel toward said rear edge of said support panel, each of said curved sections having an apex being spaced from said rear edge, each of said curved sections being aligned with a respective one of said bumpers wherein each of said curved sections of said lip is configured to restrain a bottom end of a respective one of the beverage containers thereby inhibiting the bottom end from sliding along said top surface of said support panel.

6. The assembly according to claim 1, wherein:
said tray has a perimeter edge, said perimeter edge having a first lateral side and a second lateral side;
a pair of first straps, each of said first straps being coupled to said tray, each of said first straps being matable to each other wherein said pair of first straps is configured to be wrapped around the support upon which said tray is positioned, each of said first straps extending away from a respective one of a first lateral side and a second lateral side of said perimeter edge of said first panel of said tray, each of said first straps having a distal end with respect to said respective first lateral side or second lateral side; and
a pair of first mating members, each of said first mating members being attached to a respective one of a top surface or a bottom surface of a respective one of said pair of first straps, each of said first mating members being positioned adjacent to said distal end of said respective first strap, each of said first mating members being releasably matable to each other wherein said pair of first mating members is configured to secure said first straps around the support upon which said tray is positioned.

7. The assembly according to claim 1, wherein:
each of said pair of grapples includes a sleeve;
a pair of second straps, each of said second straps being coupled to a respective one of said grapples, each of said second straps being matable to each other wherein each of said second straps is configured to be wrapped around an article of luggage, each of said second straps having a distal end with respect to said sleeve associated with said respective grapple; and
a pair of second mating members, each of said second mating members being attached to a respective one of a first surface or a second surface of a respective one of said second straps, each of said second mating members being positioned adjacent to said distal end of a respective one of said second straps, each of said second mating members being releasably matable to each other wherein said pair of second mating members is configured to secure said second straps around the article of luggage.

8. A foldable tray assembly being attachable to a passenger seat or an article of luggage for supporting various items including food and drinks, said assembly comprising:
a tray comprising a first panel being hingedly coupled to a second panel such that said tray is positionable between a flattened position and a folded position;
a net being attached to said tray, said net surrounding said tray wherein said net is configured to inhibit the objects from sliding off of said tray;
a cup holder unit being hingedly attached to said tray, said cup holder unit being positionable in a deployed position when said tray is in said flattened position wherein said cup holder unit is configured to support a pair of beverage containers, said cup holder unit being positionable in a stored position having said cup holder unit resting against said net;
a pair of grapples, each of said grapples being pivotally attached to said tray, each of said grapples being positionable in a deployed position when said tray is in said flattened position wherein each of said grapples is configured to engage a support object thereby mounting said tray to the support object, each of said grapples being positionable in a stored position when said tray is in said folded position having said pair of grapples resting against said tray;
wherein said first panel has a first edge being hingedly coupled to a primary edge of said second panel, a top surface of said first panel lying on a plane being coplanar with an upper surface of said second panel when said tray is in said flattened position wherein said tray is configured to support items, said top surface of said first panel being oriented to face said upper surface of said second panel when said tray is in said folded position thereby facilitating said tray to be placed in storage; and
wherein said net has a bottom edge being attached to said top surface of said first panel and said upper surface of said second panel, said bottom edge extending substantially around a perimeter edge of each of said first panel and said second panel when said tray is in said flattened position, said net being folded between said first panel and said second panel when said tray is in said folded position, said net having a tube being positioned to extend around a top edge of said net, said tube having an elastomeric drawstring being positioned within said tube for retaining said net in a preferred shape when said tray is in said flattened position.

9. The assembly according to claim 8, wherein each of said grapples comprises a sleeve having a lower end and an upper end, said sleeve having a pivot point located adjacent to said lower end, said pivot point pivotally engaging said perimeter edge of said first panel of said tray, said upper end being open, said lower end being closed, said sleeve extending upwardly along said net having said upper end being aligned with said tube on said top edge of said net when said sleeve is a deployed position, said sleeve resting against a bottom surface of said first panel when said sleeve is in a stored position.

10. The assembly according to claim 9, wherein each of said grapples includes a hook having a primary end being inserted into said upper end of said sleeve, said hook having a series of bends being spaced apart from each other and being distributed from a secondary end of said hook toward said primary end of said hook to define a top portion of said hook being perpendicularly oriented between a leg portion of said hook and a finger portion of said hook, said primary end being associated with said leg portion, said secondary end being associated with said finger portion wherein said top portion of said hook is configured to rest on top of the support object having said finger portion extending downwardly behind the support object.

11. A foldable tray assembly being attachable to a passenger seat or an article of luggage for supporting various items including food and drinks, said assembly comprising:
a tray comprising a first panel being hingedly coupled to a second panel such that said tray is positionable between a flattened position and a folded position, said first panel having a first edge being hingedly coupled to a primary edge of said second panel, a top surface of said first panel lying on a plane being coplanar with an upper surface of said second panel when said tray is in said flattened position wherein said tray is configured to support items, said top surface of said first panel being oriented to face said upper surface of said second panel when said tray is in said folded position thereby facilitating said tray to be placed in storage;
a net being attached to said tray, said net surrounding said tray wherein said net is configured to inhibit the objects from sliding off of said tray, said net having a bottom edge being attached to said top surface of said first panel and said upper surface of said second panel, said bottom edge extending substantially around a perimeter edge of each of said first panel and said second panel when said tray is in said flattened position, said net being folded between said first panel and said second panel when said tray is in said folded position, said net having a tube being positioned to extend around a top edge of said net, said tube having an elastomeric drawstring being positioned within said tube for retaining said net in a preferred shape when said tray is in said flattened position;

a cup holder unit being hingedly attached to said tray, said cup holder unit being positionable in a deployed position when said tray is in said flattened position wherein said cup holder unit is configured to support a pair of beverage containers, said cup holder unit being positionable in a stored position having said cup holder unit resting against said net, said cup holder unit comprising:

an upright panel having a back side being attached to said net such that an upper edge of said upright panel is aligned with said tube on said top edge of said net and having a lower edge of said upright panel being positioned adjacent to said tray;

a pair of bumpers, each of said bumpers having a first surface being bonded to a front side of said upright panel, each of said bumpers being elongated to extend along an axis being oriented parallel with said upper edge of said upright panel, each of said bumpers having a second surface which curves toward said first surface between each of a first end and a second end of said bumpers wherein said second surface of each of said bumpers is configured to conform to curvature of a beverage cup, said bumpers being spaced apart from each other on said front side of said upright panel;

a pair of elastomeric bands, each of said elastomeric bands having a first end being coupled to said first end of a respective one of said bumpers, each of said elastomeric bands having a second end being coupled to said second end of a respective one of said bumpers such that each of said elastomeric bands extends across said second surface of said respective bumper, each of said elastomeric bands having a grip being centrally located on said elastomeric bands wherein said grip on a respective one of said elastomeric bands is configured to be gripped to stretch said respective elastomeric band around the beverage cup for securing the beverage cup against said respective bumper; and a support panel having a rear edge being hingedly coupled to said lower edge of said upright panel, said support panel having a top surface lying on a plane being perpendicularly oriented with said front side of said upright panel when said cup holder unit is positioned in said deployed position wherein said top surface of said support panel is configured to having a bottom end of the beverage containers placed on said top surface of said support panel, said top surface of said support panel being directed toward said front side of said upright panel when said cup holder unit is positioned in said stored position, said support panel having a lip extending upwardly from said top surface of said support panel, said lip extending along a first lateral edge and a second lateral edge of said support panel, said lip having a pair of curved sections each extending from a front edge of said support panel toward said rear edge of said support panel, each of said curved sections having an apex being spaced from said rear edge, each of said curved sections being aligned with a respective one of said bumpers wherein each of said curved sections of said lip is configured to restrain a bottom end of a respective one of the beverage containers thereby inhibiting the bottom end from sliding along said top surface of said support panel;

a pair of grapples, each of said grapples being pivotally attached to said tray, each of said grapples being positionable in a deployed position when said tray is in said flattened position wherein each of said grapples is configured to engage a support object thereby mounting said tray to the support object, each of said grapples being positionable in a stored position when said tray is in said folded position having said pair of grapples resting against said tray, each of said grapples comprising:

a sleeve having a lower end and an upper end, said sleeve having a pivot point located adjacent to said lower end, said pivot point pivotally engaging said perimeter edge of said first panel of said tray, said upper end being open, said lower end being closed, said sleeve extending upwardly along said net having said upper end being aligned with said tube on said top edge of said net when said sleeve is a deployed position, said sleeve resting against a bottom surface of said first panel when said sleeve is in a stored position; and a hook having a primary end being inserted into said upper end of said sleeve, said hook having a series of bends being spaced apart from each other and being distributed from a secondary end of said hook toward said primary end of said hook to define a top portion of said hook being perpendicularly oriented between a leg portion of said hook and a finger portion of said hook, said primary end being associated with said leg portion, said secondary end being associated with said finger portion wherein said top portion of said hook is configured to rest on top of the support object having said finger portion extending downwardly behind the support object;

a pair of first straps, each of said first straps being coupled to said tray, each of said first straps being matable to each other wherein said pair of first straps is configured to be wrapped around the support upon which said tray is positioned, each of said first straps extending away from a respective one of a first lateral side and a second lateral side of said perimeter edge of said first panel of said tray, each of said first straps having a distal end with respect to said respective first lateral side or second lateral side;

a pair of first mating members, each of said first mating members being attached to a respective one of a top surface or a bottom surface of a respective one of said pair of first straps, each of said first mating members being positioned adjacent to said distal end of said respective first strap, each of said first mating members being releasably matable to each other wherein said pair of first mating members is configured to secure said first straps around the support upon which said tray is positioned; and a pair of second straps, each of said second straps being coupled to a respective one of said grapples, each of said second straps being matable to each other wherein each of said second straps is configured to be wrapped around an article of luggage, each of said second straps having a distal end with respect to said sleeve associated with said respective grapple; and a pair of second mating members, each of said second mating members being attached to a respective one of a first surface or a second surface of a respective one of said second straps, each of said second mating members being positioned adjacent to said distal end of a respective one of said second straps, each of said second mating members being releasably matable to each other wherein said pair of second mating members is configured to secure said second straps around the article of luggage.

\* \* \* \* \*